United States Patent Office 3,122,506
Patented Feb. 25, 1964

---

3,122,506
METHOD OF PREPARING A LUBRICANT
Franciscus Johannes Verest and Caspar Laurentius Johannes Koolen, both of Eindhoven, Netherlands, assignors to North American Philips Company, Inc., New York, N.Y., a corporation of Delaware
No Drawing. Filed Dec. 19, 1960, Ser. No. 76,476
Claims priority, application Netherlands Dec. 22, 1959
3 Claims. (Cl. 252—25)

This invention relates to a method of preparing a lubricant comprising powdered crystalline molybdenum disulphide and/or tungsten disulphide.

It is known that crystalline $MoS_2$ can be prepared in an alkaline reacting melt at high temperature. For this purpose, a mixture of potassium carbonate, sulphur and molybdenum dioxide in a weight ratio of approximately 3:6:4 is heated in a Perrot gas furnace for 30 minutes at the temperature maximally obtainable in said furnace, that is to say at a temperature which far exceeds 1000° C. per gram mole of Mo approximately 1.5 gram-equivalent of $K_2CO_3$ is added.

It is also known to prepare crystalline $WS_2$ according to an analogous reaction.

In addition, it is known that a lubricant, consisting of crystalline $MoS_2$, can be prepared by heating molybdenum or molybdenum compounds together with alkaline reacting compounds and sulphur and/or sulphur compounds, in which sulphur is present in a bivalent form, at a temperature of only 300–500° C. for ½–10 hours. The quantity of the alkaline reacting compound used varies from 0.5 g. equivalent to 4 g. equivalent per gram mole of Mo.

According to the invention, a lubricant consisting of powdered crystalline molybednum disulphide and/or tungsten disulphide is prepared starting from molybdenum and/or tungsten, oxides thereof or compounds which are converted into oxides on heating, by heating this together with sulphur and a flux and leaching the melt after cooling. The method is characterized in that as a flux is used a non-oxidizing, neutral-reacting alkali compound which, under these conditions, does not react noteworthy with the molybednum, the tungsten or the compounds thereof in a quantity of from $\frac{1}{20}$ to 1 g. equivalent per gram mole of molybdenum and/or tungsten and that the reaction is carried out at a temperature between 700 and 1100° C.

The method according to the invention is distinguished from the known methods in that a neutral-reacting flux is used and that in general smaller quantities of flux are used in combination with a higher temperature, as a result of which a purer and better crystalline product with a considerably better yield is obtained.

When using a smaller quantity of flux than the lower limit indicated, the reaction product contains a contamination of metal or oxide which harmfully influences the lubricating properties of the $MoS_2$ and $WS_2$. The use of quantities of flux larger than the upper limit value indicated has as a result that the reaction product, according to the quantity of flux, is contaminated with sulfomolybdates or sulfotungstates, which, it is true, can be removed by leaching, but at any rate decrease the yield considerably.

Products prepared at a temperature between 700 and 1100° C., in contrast with those prepared at lower temperature, are completely crystalline and consequently have excellent lubricating properties. X-ray diffraction diagrams show that products prepared below 700° C. show a considerable quantity of lattice defects or are even more or less amorphous, while those prepared at a temperature between 700 and 1100° C. yield X-ray diagrams which substantially do not differ from purified molybdenite occurring in nature, albeit, that the reflections of $WS_2$ naturally differ a little from those of $MoS_2$.

According to the invention neutral salts of alkali metals, in particular of sodium and potassium, are used as a flux. Particularly suitable are the non-oxidizing inorganic neutral-reacting sodium or potassium compounds. Ions other than alkali ions are hard to remove after completion of the reaction because, for example, insoluble molybdates and/or tungstenates are formed in addition to the sulphides. Oxidizing salts, such as nitrates and chlorates, should naturally be avoided and it is clear that salts which react under these conditions with the molybdenum, tungsten or compounds thereof, such as $Na_3PO_4$ or acid-reacting salts, are not to be considered either. It also appears that as starting substances in these reactions only the free metals molybdenum and/or tungsten, the oxides thereof or compounds which are converted into the oxides on heating can be used. Compounds such as $Na_2MoO_4$ or $CaWo_4$ are unsuitable because in this case undesired side reactions occur which contaminate the products and decrease the yield considerably.

As a lubricant $MoS_2$ is useful to a temperature of approximately 400° C. In the case of the lubricating conditions of a bearing, the oxygen supply is apparently hampered, so that the lubricant is then resistant to somewhat higher temperatures. $WS_2$, which is heated in air, starts oxidizing only at approximately 500° C. So as a lubricant $WS_2$ is useful at a temperature which is approximately 100° C. higher than in the case of $MoS_2$. In order to facilitate the preparation of the lubricant, the $MoS_2$ and/or $WS_2$ according to the invention may be mixed in known manner with a liquid or pasty lubricant.

In order that the invention may be readily carried into effect, it will now be described in greater detail with reference to the following examples.

Example I

A mixture of 15 g. of powdered ammonium paramolybdate $(NH_4)_{10}Mo_7O_{28} \cdot H_2O$, 15 g. of flowers of sulphur and 0.5 g. of KCl is heated at a temperature of 950° C. for one hour in a quartz crucible closed with a cover. After cooling, the contents of the crucible are leached with distilled water and the residue is dried. The yield of $MoS_2$ amounts to approximately 90% of the theoretical. A completely crystalline product is obtained which has excellent lubricating properties. By heating at 750° C. for 2 hours or at 1050° C. for 20 minutes, analogous results are obtained. The content of flowers of sulphur in the starting mixture may also be increased to 20 g. and the content of KCl to 3 g. without any objection.

Mixtures as described above but which contain instead of potassium chloride equivalent quantities of sodium chloride, anhydrous sodium sulphate and potassium sulphate, yield substantially equal products qualitatively and quantitatively.

Example II 15 g. of molybednum trioxide ($MoO_3$), 10 g. of flowers of sulphur and 2 g. of potassium chloride are mixed, heated in a closed quartz crucible at a temperature of 900° C. for 30 minutes and leached. If the X-ray diffraction patterns of the resulting $MoS_2$ are compared with those of purified natural molybdenite, both patterns appear to be identical.

Example III 15 g. of powdered molybdenum metal are mixed with 15 g. of flowers of sulphur and 1 g. of KCl and also heated in a closed quartz crucible at a temperature of 1000° C. for one hour. After leaching, a product is obtained of a quality as in the preceding examples. In this case also, equivalent quantities of the salts and alkalis mentioned in Example I may be used instead of potassium chloride in quantities between $\frac{1}{20}$ and 1 g. equivalent.

*Example IV*

A mixture of 20 g. of tungsten powder, 15 g. of flowers of sulphur and 1 g. of potassium chloride is heated at a temperature of 950° C. for one hour in a closed quartz crucible. Leaching with distilled water is carried out after cooling and the residue is dried. The yield of $WS_2$ amounts to approximately 90% of the theoretical. A completely crystalline product is obtained with excellent lubricating properties. The same result is obtained if the mixtures are heated at 750° C. for 2 hours or at 1050° C. for 30 minutes. The contents of flowers of sulphur in the starting mixture can be increased without any objection to 20 g. and the content of KCl herein to 5 g. In this case also, qualitatively and quantitatively substantially the same results are obtained if the KCl in equivalent quantity is replaced by one of the salts or alkalis of Example I. If X-ray diffraction patterns of a number of the thus obtained products are compared with those of a purified molybdenite sample, entire correspondence is observed in this case also with the exception of a small difference in the angles of deflection.

*Example V*

20 g. of tungstic acid ($H_2WO_4$), 1 g. of potassium chloride and 15 g. of flowers of sulphur are mixed in a closed quartz crucible for one hour at 1050° C. and then leached. In this case also, a good crystalline $WS_2$-powder is obtained having excellent lubricating properties.

*Example VI*

10 g. of molybdenum powder, 10 g. of tungsten powder, 15 g. of flowers of sulphur, 1 g. of sodium chloride are mixed thoroughly and heated at a temperature of 1000° C. for 30 minutes in a closed quartz crucible. After leaching, a product is obtained consisting of a crystalline mixture of $MoS_2$ and $WS_2$ having also excellent lubricating properties.

What is claimed is:

1. In the method of preparing a lubricant selected from the group consisting of powdered crystalline molybdenum disulfide, tungsten disulfide and mixtures thereof wherein a member of the group consisting of molybdenum, tungsten, mixtures thereof and oxides thereof is heated together with sulfur and a flux and the resultant melt is leached after cooling the improvement which consists in heating said reactants at a temperature between 700° C. and 1100° C. and employing as the flux a neutral alkali metal compound selected from the group consisting of potassium chloride, sodium chloride, sodium sulphate, and potassium sulphate in a quantity of $\frac{1}{20}$–1 gram equivalent per gram mol of the molybdenum and tungsten.

2. The method of claim 1 in which the flux is a sodium compound.

3. The method of claim 1 in which the flux is a potassium compound.

References Cited in the file of this patent
UNITED STATES PATENTS 2,892,741      Spengler et al. _____ June 30, 1959